Aug. 1, 1933.   O. F. HIPKINS   1,920,506
TRACTION DEVICE
Filed Nov. 17, 1930   2 Sheets-Sheet 1
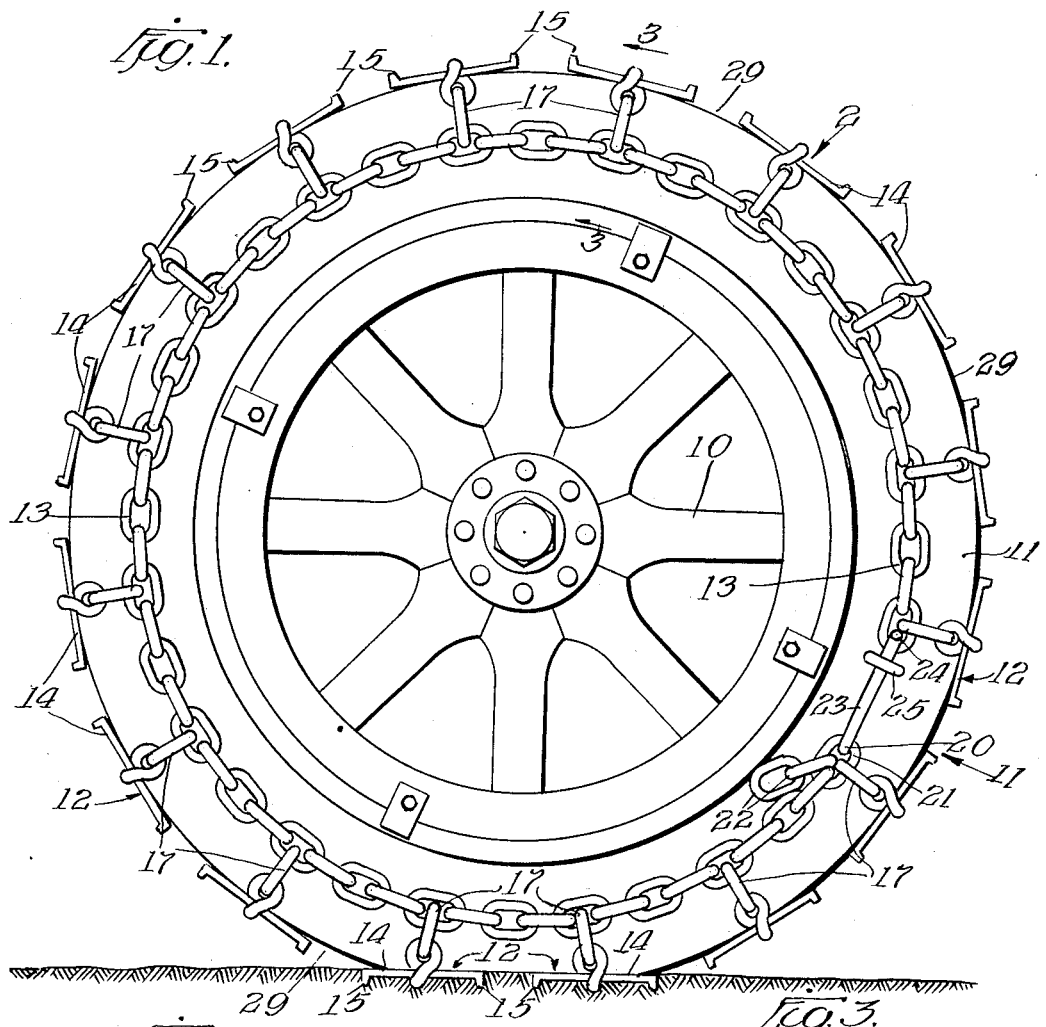
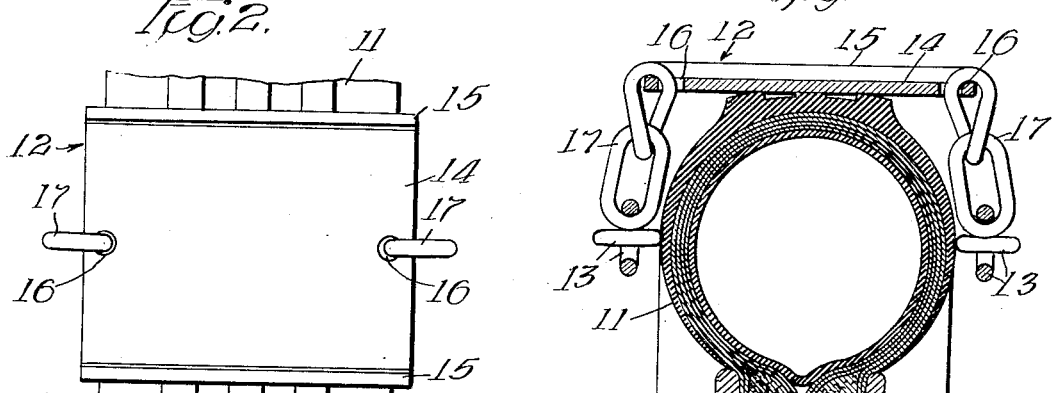

Aug. 1, 1933. O. F. HIPKINS 1,920,506
TRACTION DEVICE
Filed Nov. 17, 1930 2 Sheets-Sheet 2
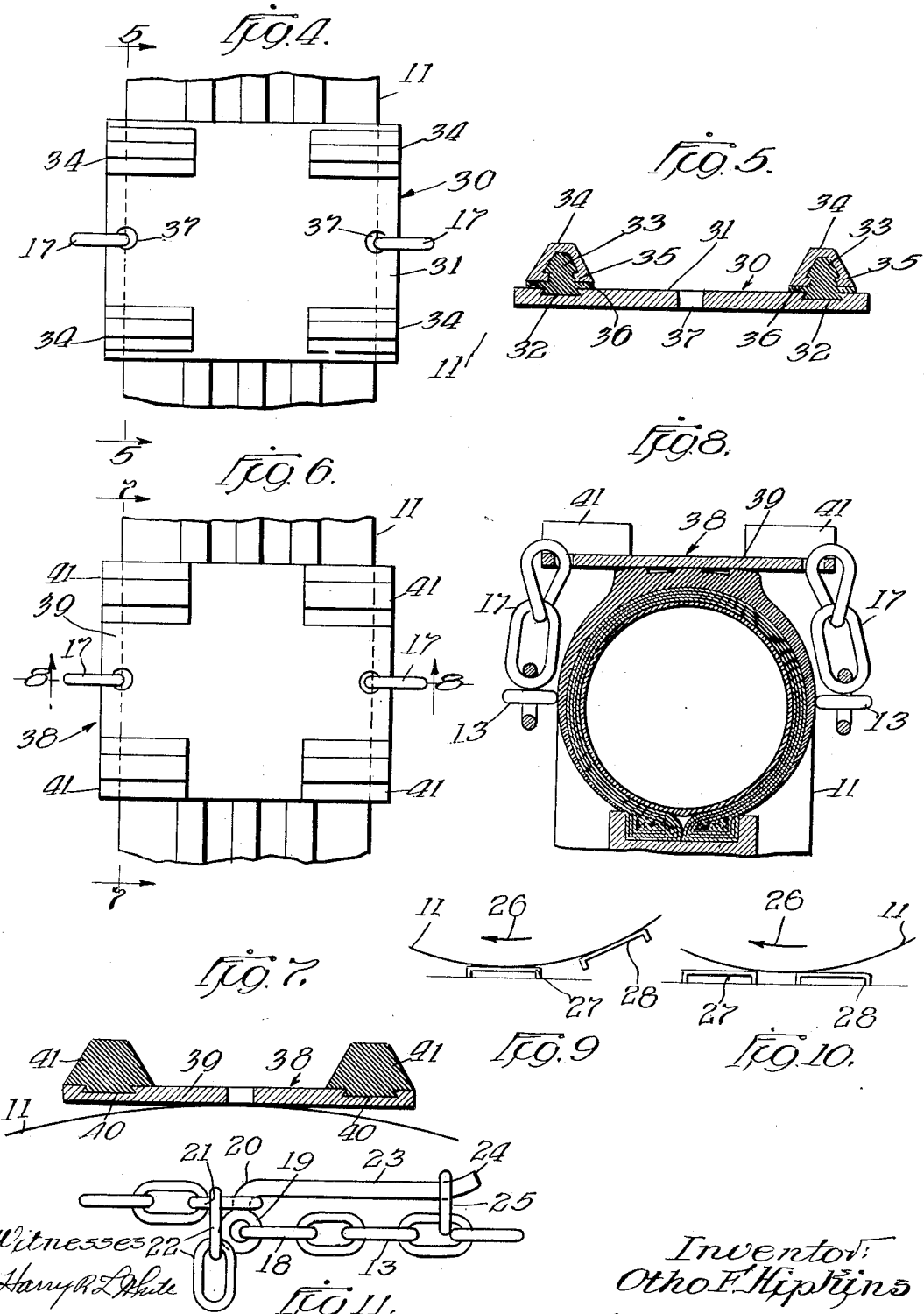

Patented Aug. 1, 1933

1,920,506

UNITED STATES PATENT OFFICE 1,920,506

TRACTION DEVICE

Otho F. Hipkins, Port Deposit, Md.

Application November 17, 1930
Serial No. 496,141

2 Claims. (Cl. 152—14)

My invention relates to traction devices for vehicle wheels and is concerned generally with structures of this type which are intended to increase the tractive effort of the wheels and may be arranged to lessen the destructive effect thereof on the roadway.

One object of my invention is to provide a device of the character described comprising a plurality of shoes disposed around the tread of the vehicle wheel whether of the single or dual tread type, the shoes being connected at their opposite ends to flexible devices loosely disposed around the wheel adjacent the side walls of the tire and arranged to permit a rocking action of each shoe relative to the tread.

A further object is to provide a device of the character described in which each shoe has attached thereto traction members, preferably formed of a material which is not injurious to the roadway, such as yieldable or elastic materials in general and rubber in particular.

A further object is to devise a traction shoe having a novel arrangement of, and characterized by a novel method of attaching, rubber traction blocks, the rubber blocks being exposed directly for contact with the roadway, or substantially covered by a metal wearing cap.

My invention is intended as an improvement on the device illustrated and described in my United States Letters Patent, No. 1,600,588, dated September 21, 1926, and is particularly designed to provide a traction device that is capable of being operated over improved sections of roadway, as well as over more difficult terrain, and which is adaptable to single and twin tread wheels. The peculiar pivotal action of the shoes relative to the tread, which is illustrated and described in the foregoing patent, whereby a maximum of two shoes may be brought into load supporting contact with the ground is also utilized in the device of the present application. The device is also arranged to slowly creep around the tread of the wheel during the latter's continued revolution, thereby preventing undue wear at separated portions of the tread and of the elements composing the device.

These and further objects of my invention will be set forth in the following specification, reference being had to the accompanying drawings, and the novel means by which said objects are effectuated will be definitely pointed out in the claims.

In the drawings:

Fig. 1 is an elevation of a wheel provided with a single tread and equipped with my improved traction device.

Fig. 2 is an enlarged plan view of one of the traction shoes, looking in the direction of the arrow 2 in Fig. 1.

Fig. 3 is an enlarged section along the line 3—3 in Fig. 1, looking in the direction of the arrows, the tire being of the pneumatic type.

Fig. 4 is a view similar to Fig. 2, but showing a modified type of traction shoe.

Fig. 5 is a section along the line 5—5 in Fig. 4, looking in the direction of the arrows, and showing the construction of the traction elements.

Fig. 6 is a view of a further modification of the traction shoe, the view being also similar to Fig. 2.

Fig. 7 is a section along the line 7—7 in Fig. 6, looking in the direction of the arrows, and showing the type of traction members employed in this modification.

Fig. 8 is a section along the line 8—8 in Fig. 6, looking in the direction of the arrows, and showing the indicated shoe modification in position on a pneumatic tire.

Figs. 9 and 10 are diagrammatic views illustrating the action of the shoes forming my device by reason of their pivotal relation to the wheel.

Fig. 11 is a view looking in the direction of the arrow 11 and showing the manner of adjusting the traction device to compensate for wear of the tire treads, it being understood that there is a similar device on the opposite side of the tire.

Referring to the drawings, the numeral 10 represents a vehicle wheel provided with a pneumatic tire 11. A plurality of shoes 12 is disposed around the tread of the tire 11 at equally spaced intervals, each of the shoes being transversely disposed across the tread and connected at their opposite ends to a pair of chains 13, each of which is located adjacent a side wall of the tire 11 and relatively loose with respect to said tire for a purpose hereinafter explained. The details respecting the nature of the connections between the several shoes and the chains will be presently described.

Each of the shoes 12 is formed as a channel section and comprises a flat base 14, the under side of which contacts with the periphery of the tire 11, with the flanges 15—15 projecting outwardly from the opposite side of said base and extending transversely across the tread of the tire. At each end of the base 14 and centrally disposed between the flanges 15 is an aperture 16 through which passes a link of a short chain section 17, the other end link of which is connected to a link of one of the chains 13, thus securing each shoe to the chains 13 and retaining the former in position on the tire.

Owing to the nature of the attachment of the several shoes to the chains 13 and the fact that the latter are loosely disposed around the side walls of the tire, each of the shoes is capable of a certain freedom of action relative to the tread which permits them to not only rock in directions parallel with the plane of the wheel but also at right angles thereto. Hence, the several shoes are connected to the chains by what is substantially a universal joint.

In order to adapt my device to wheels of various diameters, within definite limits, and to adjust the device to compensate for wear of the tire which necessitates shortening the overall length of the device, the ends of each chain are connected by the arrangement shown more particularly in Fig. 11. Attached to an end link, such as 18, of each of the chains 13 is an eye 19 having a short arm 20 which passes through a convenient link 21 at the opposite end of the chain, leaving, if required, links 22—22 for purpose of adjustment. The arm 20 terminates in a member 23 which is normally disposed to the arm 20 and lies closely adjacent to that portion of the chain 13 of which the link 18 forms a part. The extremity of the member 23 may be slightly bent as at 24 in order to retain in position a locking link 25 which is looped over the member 23 and is carried by one of the links of the chain 13. This arrangement affords a convenient mode of securing the ends of the chain together, while quickly permitting an adjustment for length and a complete removal of the device from the tire. The tendency of the member 23 to move in a counter clockwise direction under the pull of the link 21, as shown in Fig. 11, is effectually resisted by the locking link 25. However, when the vehicle is at rest, the member 23 may be easily depressed towards the adjacent chain section to permit the withdrawal of the link 25 and the separation of the chain ends.

The operation of my improved traction device is as follows:

The pivotal action of the several shoes with reference to the tread is set forth in detail in the patent above noted and will therefore not be rediscussed in the present instance. For the purpose of this application, Figs. 9 and 10 indicate in a diagrammatic way the peculiar action of the shoes.

Assume that the wheel 10 is rotating in the direction of the arrow 26 in said figures and that a shoe 27 has reached the position in contact with the ground as shown in Fig. 9. As the wheel rotates, an adjacent shoe 28 is brought into contact with the ground and immediately begins to carry a portion of the load. Inasmuch as the first element of the shoe 28 to contact with the ground is one of the flanges, it follows that the shoe, due to its substantially pivotal relation to the tire, will be rotated until the other flange of the same shoe is also in contact with the ground, as shown in Fig. 10. Since the action of the shoe 27, as it moves towards the left in said figure, is the reverse of that described for the shoe 28, it is apparent that there will always be a full tractive effort exerted by at least one shoe and at certain instants during the rotation of the wheel by two shoes. Hence, the largest possible portion of my traction device is always in contact with the ground. In the event that the vehicle is moving over soft soil, or muddy ground, so that the wheels sink deeply into the ground, tractive effort will still be exerted by those shoes which are sustaining the load at any given instant, while those shoes which are disposed below the surface of the ground, but which are not bearing any weight, assist in the traction through a grouser action with the surrounding soil. Owing to the absence of any positive driving connection between the device and the wheel, the former is able to slowly creep around the tread during the continued revolution of the wheel to thereby prevent excessive wear of the tread and of the shoes. If, for any reason, the shoes should become caked with mud, traction can still be obtained through the flanges of adjacent shoes and the spaces such as 29 (see Fig. 1) included thereby, for the rocking movement of said shoes serves to remove the mud from the indicated spaces.

Under certain conditions of usage, such as the frequent operation of the vehicle over improved sections of roadway, it is contemplated that some provision should be made that would preserve the traction characteristics of my device, while avoiding the subjection of the roadway to excessive poundings and shocks. The modified shoe structures, illustrated in Figs. 4 to 8, inclusive, are intended as a solution of this problem and will now be described.

Referring to Figs. 4 and 5, the shoe 30 comprises a flat base member 31, the under side of which contacts with the tire tread, and on the outer side thereof is provided four dovetailed grooves 32, two of the grooves extending from each opposite end of the base 31 across said base for a predetermined distance and in directions transversely disposed to the tire. As shown in Fig. 4, each of the grooves is located adjacent a corner of the base 31 and each is intended to receive a cushion member 33 of generally tapering cross-section, as shown in Fig. 5. A wear cap 34 embraces the top and sides of each member 33 and the lower edges of the cap are bent inwardly into the body of the cushion 33 to form flange portions 35, between which and the base 31 is interposed a cushion strip 36. The wear cap 34 will be preferably formed of metal so as to prevent excessive wear of the cushion members, while the latter will serve to minimize the shocks transmitted to the roadway by the superimposed load. The shoe 31 has apertures 37, corresponding to the apertures 16 and is attached to the chains 13 in the manner above described.

In the modification shown in Figs. 6 to 8, inclusive, the traction shoe 38 comprises a flat base 39 which is generally similar to the base 31 and comprises dovetail grooves 40 which are arranged in a manner similar to the grooves 32. Each of the grooves 40 receives a cushion block 41, preferably formed of rubber, and having a frustroconical cross section. As shown in Fig. 7, the base of each block 41 is considerably wider than the smallest width of the groove 40, so that the block is provided with an adequate support on the plate and is secure against the twisting and shearing stresses present under conditions of operation.

In both of the modified shoe structures described above, the cushion traction blocks not only provide for the necessary traction contact with the ground, but accomplish this result with a minimum of shock to the roadway. Moreover, their spaced disposition renders the device comparatively free from any tendency towards mud caking and also serves to prevent side skidding.

While I have shown one preferred form of my invention, together with two modifications of the traction shoes, it is to be understood that the disclosure is for the purpose of illustration only and in nowise to limit my invention to the exact elements and combinations thereof shown, for many changes may be made in the same without departing from the spirit of my invention, particularly in the adaptation of the device to tires provided with dual treads.

I claim:

1. A traction shoe for a vehicle wheel comprising a base member provided with grooves, rubber traction blocks mounted in said grooves, and wear caps embracing the tops and sides of said blocks, the sides of each cap having flanges extending inwardly into the body of the corresponding block substantially parallel to the face of said member to leave a cushion layer between the cap and base member.

2. A traction shoe for a vehicle wheel comprising a base member provided with grooves of trapezoidal cross-section, rubber traction blocks mounted in said grooves and having laterally extending flanges abutting against the surface of said plate adjacent said grooves, and wear caps embracing the tops and sides of said blocks, the sides of each cap having flanges extending into the body of the corresponding block to overlie said first named flanges, said rubber flanges providing a cushion base for the flanges on said cap.

OTHO F. HIPKINS.